United States Patent
Childers et al.

(10) Patent No.: US 9,909,507 B2
(45) Date of Patent: Mar. 6, 2018

(54) CONTROL SYSTEM FOR CAN-TO-CAN VARIATION IN COMBUSTOR SYSTEM AND RELATED METHOD

(71) Applicant: General Electric Company, Schenectady, NY (US)

(72) Inventors: Scott Andrew Childers, Gray Court, SC (US); Sanji Ekanayake, Mableton, GA (US); Brett Matthew Thompson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 484 days.

(21) Appl. No.: 14/606,548

(22) Filed: Jan. 27, 2015

(65) Prior Publication Data

US 2016/0215703 A1 Jul. 28, 2016

(51) Int. Cl.
*F02C 9/26* (2006.01)
*F02C 9/28* (2006.01)

(52) U.S. Cl.
CPC .............. *F02C 9/26* (2013.01); *F02C 9/28* (2013.01); *F05D 2270/3015* (2013.01)

(58) Field of Classification Search
CPC .... F02C 9/26; F02C 9/28; F02C 3/145; F02C 9/32; F02C 9/34; F02C 9/48; F02C 9/50; F05D 2270/3015; F05D 2270/083; F05D 2270/14; F05D 2260/96; F23R 3/54; F23R 2900/00013

(Continued)

(56) References Cited

U.S. PATENT DOCUMENTS 4,189,939 A 2/1980 West et al.
4,528,839 A 7/1985 Blanchard et al.
(Continued)

FOREIGN PATENT DOCUMENTS

GB 2520985 A 10/2015

OTHER PUBLICATIONS

U.S. Appl. No. 13/937,078, Office Action 1 dated Dec. 14, 2015, 10 pages.
(Continued)

*Primary Examiner* — Ehud Gartenberg
*Assistant Examiner* — James McGlynn
(74) *Attorney, Agent, or Firm* — Ernest G. Cusick; Hoffman Warnick LLC

(57) ABSTRACT

A control system for a combustor system including a plurality of can combustors, each can combustor accommodating combustion of a plurality of combustion fluids in a combustion chamber thereof is provided. The control system may include a calculator calculating: a) a pressure drop for each respective can combustor of the plurality of can combustors between a selected combustion fluid upstream of the combustion chamber and a combustion flow within the combustion chamber of the respective can combustor, and b) a differential between the respective pressure drop for each of the plurality of can combustors and an average pressure drop across all of the plurality of can combustors. The differentials identify can-to-can variation. A controller can modify a combustion parameter of at least one can combustor to reduce the differential for the at least one can combustor. The system can work iteratively to reduce can-to-can variation.

13 Claims, 5 Drawing Sheets

(58) Field of Classification Search
USPC .......................................................... 60/772
See application file for complete search history.

(56) References Cited

U.S. PATENT DOCUMENTS

| | | | | |
|---|---|---|---|---|
| 5,319,931 | A | * | 6/1994 | Beebe ..................... F02C 7/228 60/39.281 |
| 5,357,741 | A | | 10/1994 | Talabisco et al. |
| 5,410,883 | A | | 5/1995 | Nigawara et al. |
| 5,487,266 | A | | 1/1996 | Brown |
| 5,734,658 | A | | 3/1998 | Rall et al. |
| 6,226,976 | B1 | | 5/2001 | Scott et al. |
| 6,272,422 | B2 | | 8/2001 | Khalid et al. |
| 6,539,783 | B1 | | 4/2003 | Adibhatla |
| 6,564,109 | B1 | | 5/2003 | Ashby et al. |
| 6,618,690 | B1 | | 9/2003 | Syrjärinne |
| 6,715,277 | B2 | | 4/2004 | Zagranski et al. |
| 6,823,675 | B2 | | 11/2004 | Brunell et al. |
| 6,871,160 | B2 | | 3/2005 | Jaw |
| 6,952,640 | B2 | | 10/2005 | Bleile et al. |
| 7,021,062 | B2 | | 4/2006 | Tanaka et al. |
| 7,197,430 | B2 | | 3/2007 | Jacques et al. |
| 7,203,554 | B2 | | 4/2007 | Fuller |
| 7,269,939 | B2 | * | 9/2007 | Kothnur .................. F02C 7/222 60/39.281 |
| 7,451,601 | B2 | * | 11/2008 | Taware ..................... F23N 5/16 60/39.281 |
| 7,513,100 | B2 | | 4/2009 | Motter et al. |
| 7,620,461 | B2 | * | 11/2009 | Frederick, II ............. F02C 9/28 60/772 |
| 7,654,092 | B2 | * | 2/2010 | Ryan ........................ F02C 7/26 60/39.281 |
| 7,853,392 | B2 | | 12/2010 | Healey et al. |
| 7,966,834 | B2 | | 6/2011 | Myhre |
| 8,090,545 | B2 | | 1/2012 | Gobrecht et al. |
| 8,245,493 | B2 | | 8/2012 | Minto |
| 8,370,044 | B2 | | 2/2013 | Dean et al. |
| 8,434,291 | B2 | * | 5/2013 | Kraemer ................. F23N 5/184 431/89 |
| 8,452,515 | B2 | | 5/2013 | Drohan et al. |
| 8,474,268 | B2 | | 7/2013 | Fuller et al. |
| 8,650,009 | B2 | | 2/2014 | Forbes et al. |
| 9,334,750 | B2 | | 5/2016 | Liebau et al. |
| 9,422,866 | B2 | | 8/2016 | Zhang |
| 9,605,559 | B2 | | 3/2017 | Truesdale et al. |
| 2002/0157400 | A1 | | 10/2002 | Schulten et al. |
| 2004/0073400 | A1 | | 4/2004 | Tomita et al. |
| 2008/0140352 | A1 | | 6/2008 | Goebel et al. |
| 2008/0243352 | A1 | | 10/2008 | Healy |
| 2009/0048730 | A1 | | 2/2009 | Akkaram et al. |
| 2009/0173078 | A1 | | 7/2009 | Thatcher et al. |
| 2009/0326890 | A1 | | 12/2009 | Shetty et al. |
| 2011/0210555 | A1 | | 9/2011 | Xia et al. |
| 2012/0283885 | A1 | | 11/2012 | Mannar et al. |
| 2013/0006429 | A1 | | 1/2013 | Shanmugam et al. |
| 2013/0024179 | A1 | | 1/2013 | Mazzaro et al. |
| 2013/0036744 | A1 | | 2/2013 | Emberger et al. |
| 2013/0152587 | A1 | | 6/2013 | Jordan, Jr. et al. |
| 2013/0158731 | A1 | | 6/2013 | Chandler |
| 2014/0156165 | A1 | | 6/2014 | Ewens et al. |
| 2014/0244055 | A1 | | 8/2014 | Rosson |
| 2014/0257666 | A1 | | 9/2014 | Abrol et al. |
| 2014/0260312 | A1 | | 9/2014 | Davis, Jr. et al. |
| 2015/0007574 | A1 | | 1/2015 | Morgan et al. |
| 2015/0160051 | A1 | | 6/2015 | O'Mello |
| 2015/0234951 | A1 | | 8/2015 | Andersson et al. |
| 2015/0260612 | A1 | | 9/2015 | DeSilva et al. |
| 2016/0138470 | A1 | | 5/2016 | Davis, Jr. et al. |

OTHER PUBLICATIONS

U.S. Appl. No. 14/686,157, Office Action 1 dated Sep. 9, 2016, 32 pages.
U.S. Appl. No. 14/686,126, Office Action 1 dated Sep. 12, 2016, 31 pages.
U.S. Appl. No. 14/686,151, Office Action 1 dated Sep. 13, 2016, 32 pages.
U.S. Appl. No. 14/686,164, Office Action 1 dated Sep. 13, 2016, 34 pages.
U.S. Appl. No. 14/686,201, Office Action 1 dated Sep. 13, 2016, 33 pages.
U.S. Appl. No. 14/686,136, Office Action 1 dated Sep. 23, 2016, 34 pages.
U.S. Appl. No. 14/686,145, Office Action 1 dated Sep. 23, 2016, 34 pages.
U.S. Appl. No. 14/686,171, Office Action 1 dated Sep. 23, 2016, 34 pages.
U.S. Appl. No. 14/686,183, Office Action 1 dated Sep. 23, 2016, 34 pages.
European Search Report and Written Opinion Issued in Connection with Corresponding EP Application No. 14196449.4-1862 dated Mar. 6, 2015, 6 pages.
Saul, "Subsea Instrumentation Interface Standardization in the Offshore Oil and Gas Industry," IEEE International Conference on Communications, ICC , pp. 08-13-08-18, Jun. 11, 2006, 6 pages.
GB Search Report dated Jun. 3, 2014 issued in Connection with GB Patent Application No. 1321555.3 filed on Dec. 6, 2013, 3 pages.
U.S. Appl. No. 14/546,491, Notice of Allowance dated Jun. 20, 2017, 37 pages.
U.S. Appl. No. 14/546,525, Notice of Allowance dated Jun. 22, 2017, 36 pages.
U.S. Appl. No. 14/546,504, Notice of Allowance dated Jun. 30, 2017, 31 pages.
U.S. Appl. No. 14/546,498, Notice of Allowance dated Jul. 5, 2017, 38 pages.
U.S. Appl. No. 14/546,512, Notice of Allowance dated Jul. 12, 2017, 36 pages.
U.S. Appl. No. 14/546,520, Notice of Allowance dated Aug. 7, 2017, 37 pages.
U.S. Appl. No. 14/971,710, Notice of Allowance dated Aug. 22, 2017, 30 pages.
U.S. Appl. No. 14/971,730, Notice of Allowance dated Sep. 29, 2017, 38 pages.
U.S. Appl. No. 14/960,930, Notice of Allowance dated Oct. 2, 2017, 38 pages.
U.S. Appl. No. 14/971,680, Notice of Allowance dated Oct. 6, 2017, 37 pages.
U.S. Appl. No. 14/971,736, Notice of Allowance dated Nov. 1, 2017, 38 pages.
U.S. Appl. No. 14/971,740, Notice of Allowance dated Nov. 29, 2017, 45 pages.
U.S. Appl. No. 14/971,716, Notice of Allowance dated Nov. 29, 2017, 40 pages.
U.S. Appl. No. 14/971,690, Notice of Allowance dated Nov. 28, 2017, 37 pages.

* cited by examiner

| Original | | |
|---|---|---|
| | Measured dP | Error to Avg. |
| 1 | -16.02 | -0.33 |
| 2 | -15.62 | 0.07 |
| 3 | -15.65 | 0.03 |
| 4 | -15.89 | -0.21 |
| 5 | -15.78 | -0.09 |
| 6 | -15.53 | 0.15 |
| 7 | -15.52 | 0.16 |
| 8 | -15.42 | 0.26 |
| 9 | -15.28 | 0.40 |
| 10 | -16.36 | -0.68 |
| 11 | -15.67 | 0.01 |
| 12 | -15.46 | 0.22 |
| 13 | -15.67 | 0.01 |
| 14 | -15.52 | 0.16 |
| 15 | -15.78 | -0.09 |
| 16 | -15.62 | 0.07 |
| 17 | -15.89 | -0.21 |
| 18 | -15.89 | -0.21 |

FIG. 4

| First Pass | | |
|---|---|---|
| | Measured dP | Error to Avg. |
| 1 | -16.02 | -0.33 |
| 2 | -15.62 | 0.07 |
| 3 | -15.65 | 0.03 |
| 4 | -15.89 | -0.21 |
| 5 | -15.78 | -0.09 |
| 6 | -15.53 | 0.15 |
| 7 | -15.52 | 0.16 |
| 8 | -15.42 | 0.26 |
| 9 | -15.68 | 0 |
| 10 | -15.93 | -0.25 |
| 11 | -15.67 | 0.01 |
| 12 | -15.46 | 0.22 |
| 13 | -15.67 | 0.01 |
| 14 | -15.52 | 0.16 |
| 15 | -15.78 | -0.09 |
| 16 | -15.62 | 0.07 |
| 17 | -15.53 | -0.21 |
| 18 | -15.89 | -0.21 |

FIG. 5

| Second Pass | | |
|---|---|---|
| | Measured dP | Error to Avg. |
| 1 | -15.75 | -0.07 |
| 2 | -15.62 | 0.07 |
| 3 | -15.65 | 0.03 |
| 4 | -15.89 | -0.21 |
| 5 | -15.78 | -0.09 |
| 6 | -15.53 | 0.15 |
| 7 | -15.52 | 0.16 |
| 8 | -15.68 | 0 |
| 9 | -15.68 | 0 |
| 10 | -15.96 | -0.27 |
| 11 | -15.67 | 0.01 |
| 12 | -15.46 | 0.22 |
| 13 | -15.67 | 0.01 |
| 14 | -15.52 | 0.16 |
| 15 | -15.78 | -0.09 |
| 16 | -15.62 | 0.07 |
| 17 | -15.53 | -0.21 |
| 18 | -15.89 | -0.21 |

FIG. 6

CONTROL SYSTEM FOR CAN-TO-CAN VARIATION IN COMBUSTOR SYSTEM AND RELATED METHOD

BACKGROUND OF THE INVENTION

The disclosure relates generally to combustor systems, and more particularly, to a control system for addressing can-to-can variation in a combustor system and a related method.

Combustor systems for such industrial devices as gas turbines often include a number of can combustors in which combustion fluids such as air, fuel and diluents are mixed and combusted. More specifically, each can combustor may include a number of burner tubes into which one or more fuels and perhaps diluents are introduced via nozzles into an air flow and combusted. After initial combustion in the burner tubes, the combustion flow enters a combustion chamber. The plurality of burner tubes may be positioned by an end cap at one end of the combustion chamber. Upon exiting a can combustor, the combustion flow mixes with that of other can combustors. Once mixed, the combined combustion flow can be directed from the combustion chamber to do work, e.g., drive blades of a gas turbine. As with any combustor system, control of the combustion process to reduce and control emissions and maximizing an operating space of the combustor system is advantageous.

In combustor systems with multiple can combustors, variation of can combustor operating conditions is a significant contributor to total emissions produced and reduced operating space resulting in loss of operability. In this regard, the combination of combustion chamber pressure ($P_{CC}$) variation, combustion fluid (e.g., fuel) supply variation, and end cover effective area variation can drive can-to-can operation changes, and thus overall fuel-to-air (F/A) ratio and emissions variation. During planning of a combustor system, the fuel delivery system (manifold and flex hoses) that feed each can combustor are designed to minimize flow variation, caused by combustion fluid supply pressure variations, can-to-can. In addition, end cover and fuel nozzle arrangements are carefully arranged to minimize their effective area variation during manufacture, and over time. In operation, emissions variation is driven from, for example, the air flow in the form of nozzle throat area, air side leakages, and the impact of the back pressure applied from the combustion chamber in each can combustor. In the case of the latter contributor, higher or lower combustion chamber pressure impacts the pressure differential (dP) across the fixed area end cover, which results in can-to-can combustion fluid flow variation.

BRIEF DESCRIPTION OF THE INVENTION

A first aspect of the disclosure provides a control system for a combustor system including a plurality of can combustors, each can combustor accommodating combustion of a plurality of combustion fluids in a combustion chamber thereof, the control system comprising: a calculator calculating: a) a pressure drop for each respective can combustor of the plurality of can combustors between a selected combustion fluid upstream of the combustion chamber and a combustion flow within the combustion chamber of the respective can combustor, and b) a differential between the respective pressure drop for each of the plurality of can combustors and an average pressure drop across all of the plurality of can combustors; and a controller modifying a combustion parameter of at least one can combustor to reduce the differential for the at least one can combustor.

A second aspect of the disclosure provides a control system for a combustor system including a plurality of can combustors, each can combustor accommodating combustion of a plurality of combustion fluids in a combustion chamber thereof, the control system comprising: a sensor system including a pressure sensor for measuring a combustion flow pressure within the combustion chamber of each of the respective plurality of can combustors; a calculator calculating: a) a pressure drop calculator calculating a pressure drop for each respective can combustor of the plurality of can combustors between a selected combustion fluid upstream of the combustion chamber and the combustion flow pressure within the combustion chamber of the respective can combustor; b) a differential between the respective pressure drop for each of the plurality of can combustors and an average pressure drop across all of the plurality of can combustors; and a controller modifying a combustion parameter of at least one can combustor to reduce the differential for the at least one can combustor, and wherein the control system iteratively performs the pressure sensing, the pressure drop calculating, the differential calculating and the combustion parameter modifying.

A third aspect provides a method for controlling a combustor system including a plurality of can combustors, each can combustor accommodating combustion of a plurality of combustion fluids in a combustion chamber thereof, the method comprising: determining a pressure drop between an air flow upstream of the combustion chamber and a combustion flow within the combustion chamber of each respective can combustor; calculating a differential between the respective pressure drop for each of the plurality of can combustors and an average pressure drop across all of the plurality of can combustors; and modifying a flow of at least one combustion fluid to at least one can combustor to reduce the differential for the at least one can combustor.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIGS. 4-6 show tables of can combustor pressure drops and differentials during passes of operation by a control system according to embodiments of the invention.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a control system for a combustor system including a plurality of can combustors. Each can combustor includes a combustion chamber for accommodating combustion of a plurality of combustion fluids therein, forming a combustion flow. The control system leverages variation in pressure drops between the plurality of can combustors to infer operating condition variation, e.g., fuel-to-air, diluent-to-fuel, etc., and modifies a combustion parameter of one or more can combustors to reduce the variation, and thus improve combustor system performance. The control system may include a calculator for calculating a pressure drop for each respective can combustor of the plurality of can combustors between an air flow upstream of the combustion chamber and a combustion flow within the combustion chamber of the respective can combustor. The calculator may also calculate a differential between the respective pressure drop for each of the plurality of can combustors and an average pressure drop across all of the plurality of can combustors. A controller modifies a combustion parameter of at least one can combustor to reduce the differential for the at least one can combustor to reduce can-to-can variation. Consequently, the system uses existing combustor system pressure drops as a reference to adjust a combustion parameter, e.g., a fuel flow rate or diluent flow rate, to achieve either the desired fuel-to-air (F/A) ratio or to reduce the F/A ratio variation between combustor systems without ever actually knowing the fuel flow rate, diluent flow rate or F/A ratio. Since can-to-can variation in operating conditions is a large contributor to the total emissions, reduction of pressure drop differentials amongst can combustors may reduce total emissions. In addition, reduction of pressure drop differentials amongst can combustors may also improve an operation space by automatically addressing operational outliers, reducing outages, blow outs, etc.

Figure 1:
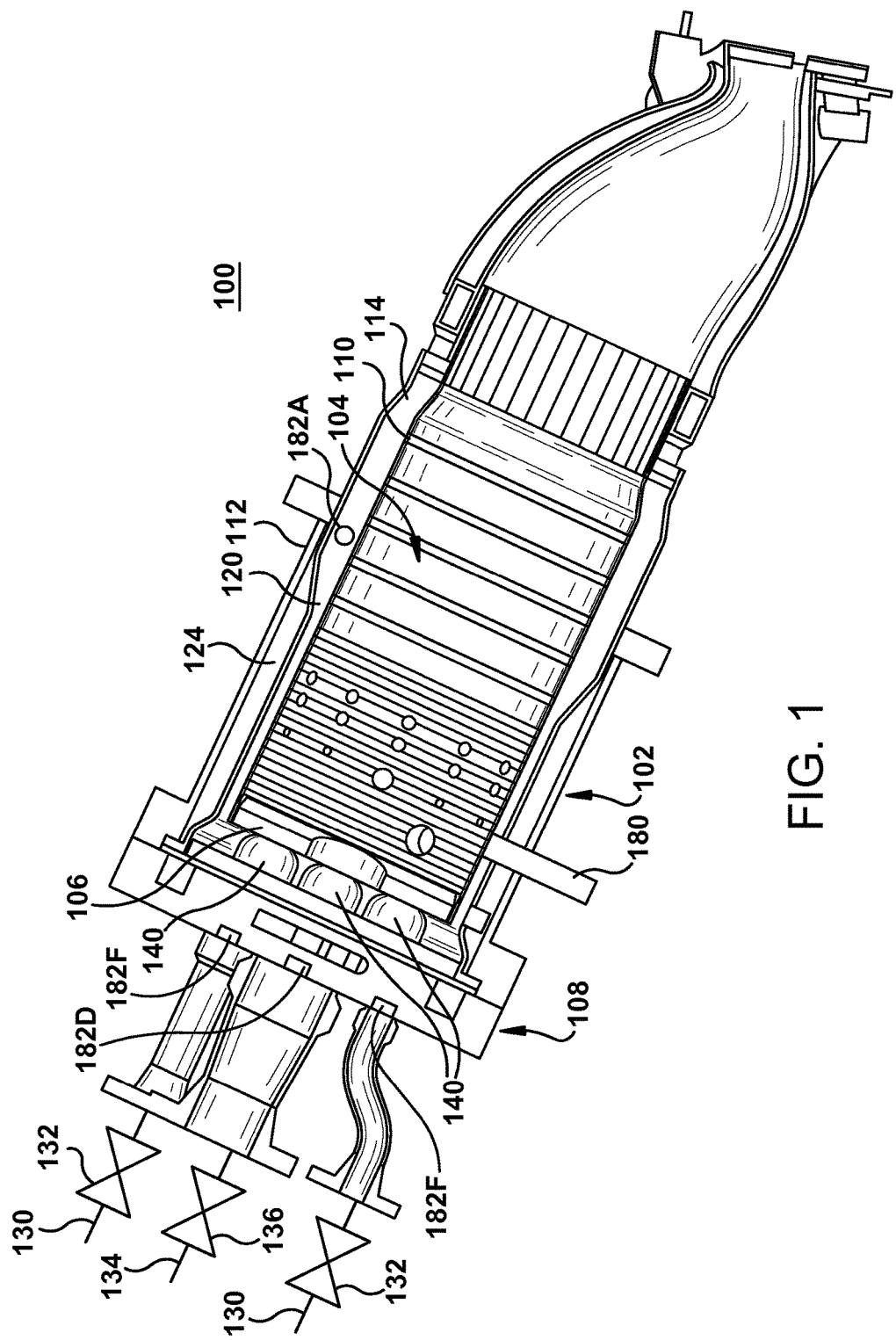
FIG. 1 shows a cross-sectional view of one can combustor of a combustor system employing a control system according to embodiments of the disclosure.

Now referring to the drawings, FIG. 1 shows a cross-sectional view of one can combustor of a combustor system 100 for, e.g., a gas turbine engine (not shown). As understood, combustor system 100 may include, inter alia, a plurality of can combustors 102 each including a combustion chamber 104 for accommodating combustion of a plurality of combustion fluids therein into a combustion flow. Can combustors 102 are typically situated in a circular manner about a combustion flow path (not shown) that feeds to, for example, a gas turbine engine. Each can combustor 102 may include a combustor end cover 106 incorporated into a combustor assembly 108. Combustor end cover 106 in accordance with exemplary embodiments of the disclosure can be incorporated into combustor assembly 108 with varying configurations and should not be limited to the configuration shown in FIG. 1. Each can combustor 102 may include combustion chamber 104 defined, at least in part, by a combustor liner 110 disposed within a casing 112. A flow sleeve 114 may be mounted within casing 112 and surrounding combustor liner 110. Within combustor casing 112, flow sleeve 114 is spaced a distance outward from combustor liner 110. A space between flow sleeve 114 and combustor liner 110 forms a portion of a chamber 120 receiving an air flow from a system compressor (not shown). In addition, a space between flow sleeve 114 and casing 112 forms a portion of a chamber 124 receiving an air flow, e.g., air collected after impingement cooling of other parts of can combustor 102. In one embodiment, air within chamber 120 may be pressurized air from a compressor discharge (not shown), providing air at pressure $P_{CD}$. Air in chamber 124 may be, for example, at a temperature in the range of approximately 370-430° C., while air in chamber 120 may be, for example, at a temperature in the range of approximately 380-450° C. Combustion flow gases within combustor system liner 110 may be, for example, at a temperature in the range of approximately 1480-1650° C.

Combustion fluids may include, for example, air, at least one fuel and perhaps at least one diluent. As described herein, air enters can combustors 102 through variety of passages, e.g., passages 120 and/or 124 among others in combustor assembly 108. Fuel(s) may include any now known or later developed fuel usable in an industrial combustor system 100, e.g., any petrochemical fuel, and may enter can combustors 102 by way of one or more fuel lines 130 (two shown, could be one or more than two) to combustor assembly 108. Each fuel line 130 may include a respective control valve 132 controlled by a controller 154 (FIG. 2), as described herein. Similarly, a diluent may include any now known or later developed diluent usable in an industrial combustor system 100, e.g., an inert gas such as argon, helium, nitrogen, carbon dioxide, etc., and may enter can combustors 102 by way of one or more diluent supply lines 134 (only one shown) to combustor assembly 108. Each diluent line 134 may include a respective control valve 136 controlled by controller 154 (FIG. 2), as described herein. While two fuels and one diluent have been shown being delivered to can combustor 102, it is emphasized that any number of each may be possible. Each may be introduced to burner tubes 140 in any now known or later developed manner, e.g., via nozzles for the at least one fuel. In one embodiment, the air pressure may match an air pressure at the compressor discharge $P_{CD}$ that supplies air to combustor system 100. In most cases, the air flow volume and pressure are not controlled, i.e., there is no valve or controller that varies the air flow or pressure. In contrast, fuel(s) flow rate supplied to can combustors 102 is typically controlled by valve(s) 132. Similarly, diluent(s) flow rate supplied to can combustors 102 is typically controlled by valve(s) 136. Consequently, a pressure, flow rate, etc., of the fuel(s) and/or diluent(s), supplied to can combustors 102 can be controlled via valves 132, 136. In operation, one or more fuels is/are fed into burner tubes 140 of can combustors 102 by nozzles and ignited therewithin with an airflow from, e.g., passages 120 and/or 124. As combustion continues, the combustion flow enters combustor liner 110, i.e., combustion chamber 104. A hot energetic exhaust flow of products of combustion, excess fuel and/or excess air move to the lower right in FIG. 1 in order to do work, e.g., drive turbine blades (not shown) to produce the desired work in a known fashion.

Figure 2:
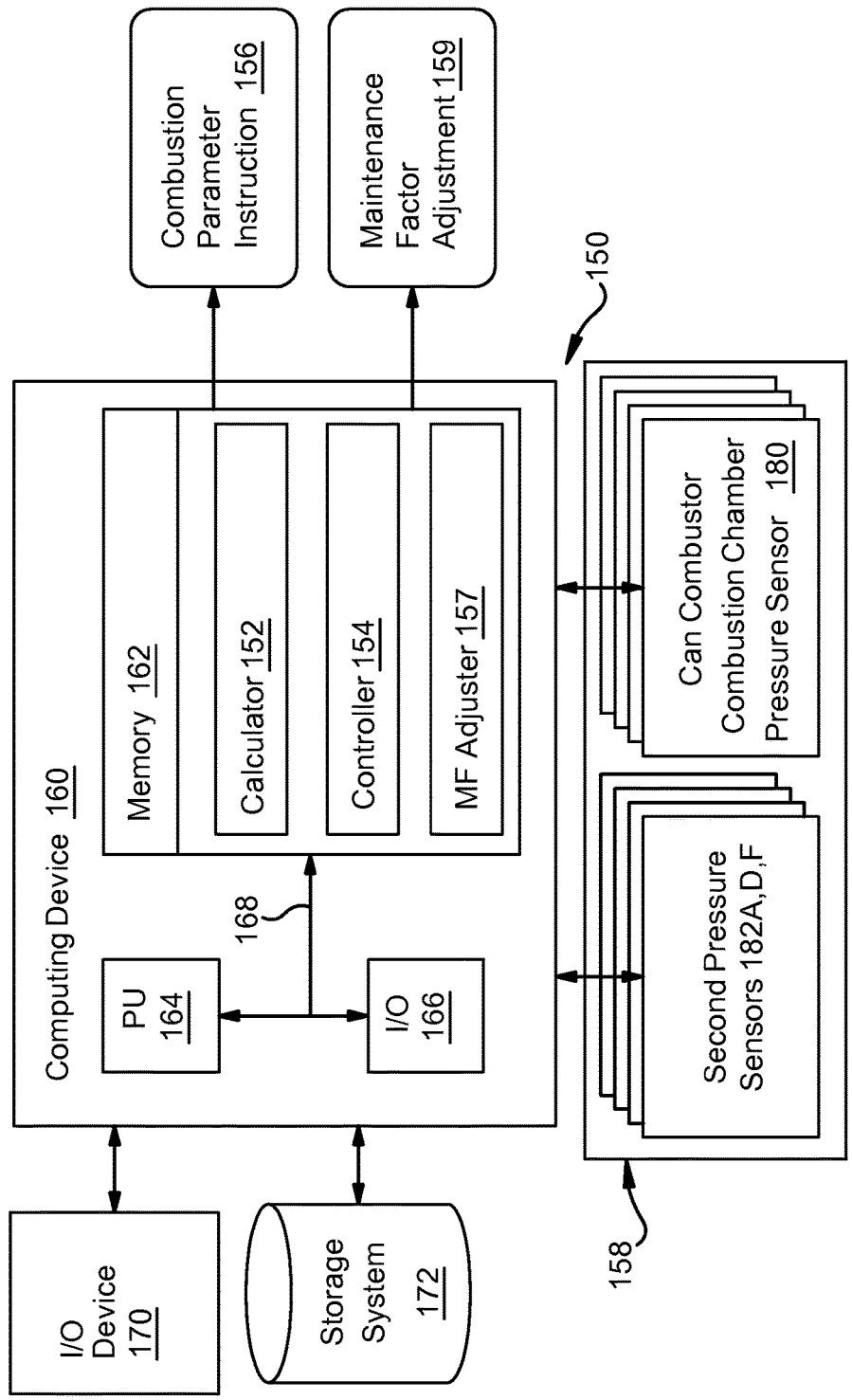
FIG. 2 shows a schematic block diagram of a computer infrastructure for implementing a control system according to embodiments of the invention.
Figure 3:
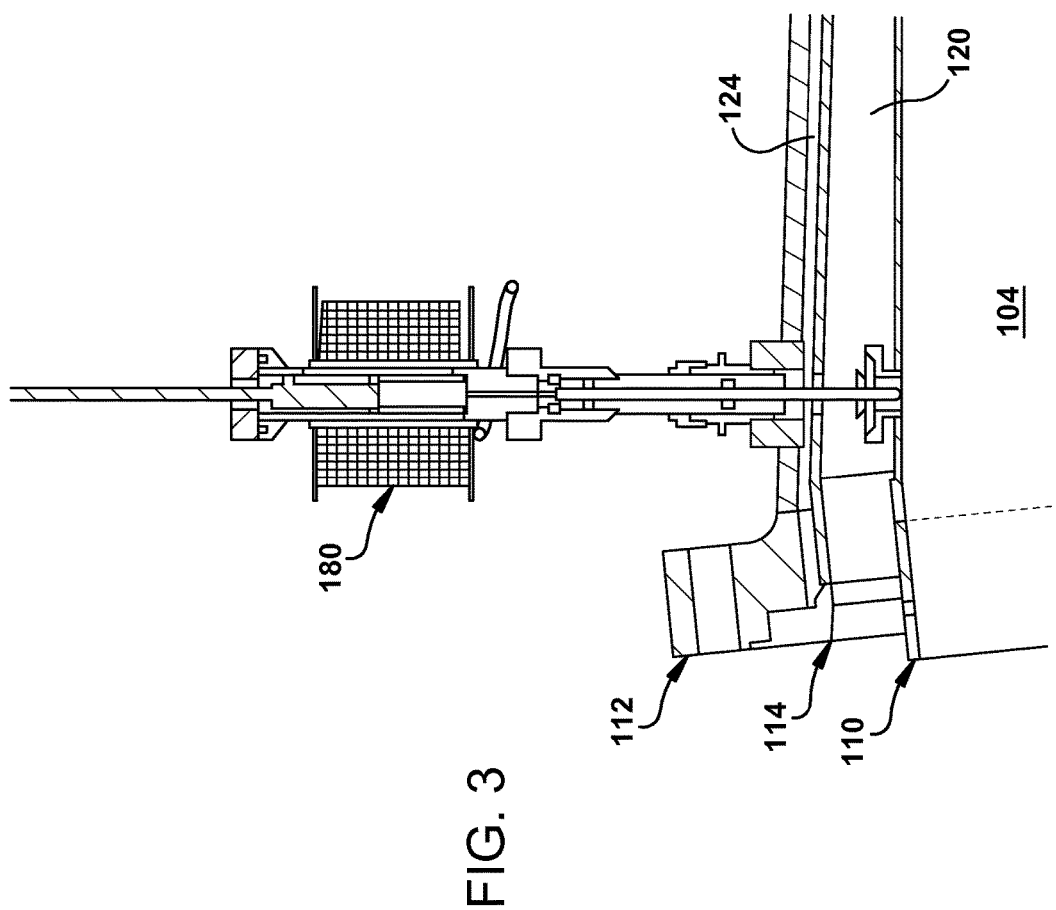
FIG. 3 shows a cross-sectional view a combustion chamber pressure sensor of a control system according to embodiments of the invention.

FIG. 2 shows a block diagram of a control system 150 for combustor system 100 (FIG. 1) according to embodiments of the invention. As will be described herein, control system 150 may include a computerized system including a calculator 152, a controller 154 for controlling and/or modifying a combustion parameter of at least one can combustor 102 (FIG. 1). In addition, control system 150 may also include a maintenance factor (MF) adjuster 157. Although one calculator 152 is illustrated for purposes of describing different calculations performed by control system 150, it is emphasized that more than one calculator may perform the various calculation functions. Control system 150 may create a combustion parameter instruction 156 for controlling one or more parts of combustor system 100, e.g., valve(s) 132, 136, to implement the modification, as will be described herein. Further, control system 150 may create a maintenance factor adjustment 159 for indicating an adjustment to a maintenance factor in response to at least one pressure drop differential being within a predetermined threshold, as will be described herein. In addition, control system 150 may also include a sensor system 158 for sensing various pressures within combustor system 100 (FIG. 1). (Although described herein as part of control system 150, it is understood that sensor system 158, and control system 150 itself, may be part of an overall control system for, for example, a gas turbine engine). In particular, sensor system 158 may measure an air pressure upstream of combustion chamber 104, e.g., in chamber(s) 120, 124 or as exiting the compressor (not shown), and a combustion flow pressure in combustion chamber 104 of each of the plurality of can combustors 102. Further, sensor system may measure a pressure of one or more fuels and one or more diluents upstream of combustion chamber 104, e.g., in their respective supply lines. To this end, sensor system 158 may include a first pressure sensor 180 for measuring the pressure of a combustor flow in combustion chamber 104 of each can combustor 102. That is, each combustion chamber 104 of each can combustor 102 includes a pressure sensor 180. As shown in FIGS. 1 and 3, pressure sensor 180 may take the form of any now known or later developed device capable of obtaining a pressure of a combustion flow within combustion chamber 104. In FIG. 3, pressure sensor 180 is shown as part of a conventional combustion dynamics monitoring (CDM) probe that penetrates casing 112, flow sleeve 114 and combustion liner 110.

In addition, as shown in FIGS. 1 and 2, sensor system 158 may include a second pressure sensors 182A, 182F, 182D. One second pressure sensor 182A may be positioned to measure a pressure of an air flow upstream of combustion chamber 104. As illustrated in FIG. 2, pressure sensor 182A may be positioned in passage 120. However, since the air flow to each of the plurality of can combustors 102 is typically provided at the same pressure via a common passage 120 and/or 124 (manifold), second pressure sensor 182A can be positioned anywhere from the compressor (not shown) to burner tubes 140. Another second pressure sensor 182F may be positioned to measure a pressure of fuel flow upstream of combustion chamber 104. As illustrated in FIG. 1, pressure sensor 182F may be positioned in a fuel line 130 of a particular fuel. However, sensor 182F may be positioned in a number of other locations, e.g., upstream of nozzles, etc. Another second pressure sensor 182D may be positioned to measure a pressure of a diluent flow upstream of combustion chamber 104. As illustrated in FIG. 2, pressure sensor 182D may be positioned in a supply line 134 of a particular diluent. However, sensor 182D may be positioned in a number of other locations, e.g., upstream of an entry point to combustion chamber 104, etc. While a particular number of each second pressure sensor 182A, 182F, 18D have been illustrated, it is understood that a number sensors can be employed for each combustion fluid, and one or more of their measurements employed, or two or more of their measurements may be averaged and the average value employed.

As will be appreciated by one skilled in the art, parts of the present invention may be embodied as an automated control system in the form of a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, parts of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the combustor system system's control computer, partly thereon, as a stand-alone software package, and partly on a remote computer or entirely on the remote computer or server. In the latter scenario, the remote computer may be connected to the combustor system system's control computer through any type of network, including a local area network (LAN) or a wide area network (WAN), or the connection may be made to an external computer (for example, through the Internet using an Internet Service Provider).

It will be understood that certain functions of control system 150 can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

FIG. 2 shows an illustrative environment for control system 150. To this extent, the environment may include a computer infrastructure that can perform certain process steps described herein. In particular, the computer infrastructure is shown including a computing device 160 that implements part of control system 150. Computing device 160 is shown including a memory 162, a processor (PU) 164, an input/output (I/O) interface 166, and a bus 168. Further, computing device 160 is shown in communication with an external I/O device/resource 170 and a storage system 172. As is known in the art, in general, processor 164 executes computer program code, such as calculator(s) 152, controller 154 and MF adjuster 157, that is stored in memory 162 and/or storage system 172. While executing computer program code, processor 164 can read and/or write data, such as pressure, pressure differentials, combustion fluid ratio data, etc., to/from memory 162, storage system 172, and/or I/O interface 170. Bus 168 provides a communications link between each of the components in computing device 160. I/O device 166 can comprise any device that enables a user to interact with computing device 160 or any device that enables computing device 160 to communicate with one or more other computing devices. Input/output devices (including but not limited to keyboards, displays, pointing devices, etc.) can be coupled to the system either directly or through intervening I/O controllers.

Computing device 160 can comprise any general purpose computing article of manufacture capable of executing computer program code installed by a user (e.g., a personal computer, server, handheld device, etc.), and may or may not be part of an overall control system for combustor system 100 (FIG. 1) or, for example, a gas turbine engine to which combustor system 100 is operatively coupled. However, it is understood that computing device 160 and control system 150 are only representative of various possible equivalent computing devices that may perform the various process steps of the disclosure. To this extent, in other embodiments, computing device 160 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure shown in FIG. 2 is only illustrative of various types of computer infrastructures for implementing the disclosure. For example, in one embodiment, the computer infrastructure may comprise two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

The block diagram in FIG. 2 illustrates the architecture, functionality, and operation of possible implementations of systems, methods and computer program products according to various embodiments of the present invention. In this regard, each block in the block diagram, e.g., calculator(s) 152, controller 154 and MF adjuster 157, may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram illustration, and combinations of blocks in the block diagram illustration, can be implemented by special purpose hardware-based systems that perform the specified functions or acts, or combinations of special purpose hardware and computer instructions.

Referring to FIGS. 4-7, an illustrative method of operation of control system 150 according to embodiments of the invention will now be described. In contrast to conventional systems, control system 150 modifies a combustion parameter, such as a fuel and/or diluent flow, particular to a can combustor(s) 102 to reduce a differential for can combustor(s) 102 and minimize can-to-can variation during operation of combustor system 100. In other words, control system 150 uses existing combustor system pressure drops as a reference to modify a combustion parameter, such as fuel and/or diluent flow, to reduce can-to-can variation and in doing so, achieve either a desired fuel-to-air (F/A) ratio or to reduce the F/A ratio variation between can combustors. Since can-to-can variation in operating conditions is a large contributor to the total emissions and a limiter of operating space, i.e., a range of permissible dynamics during which the system can be operable, reduction of a differential indicative of a particular can combustor's variation from others may reduce total emissions and improve operating space.

Figure 7:
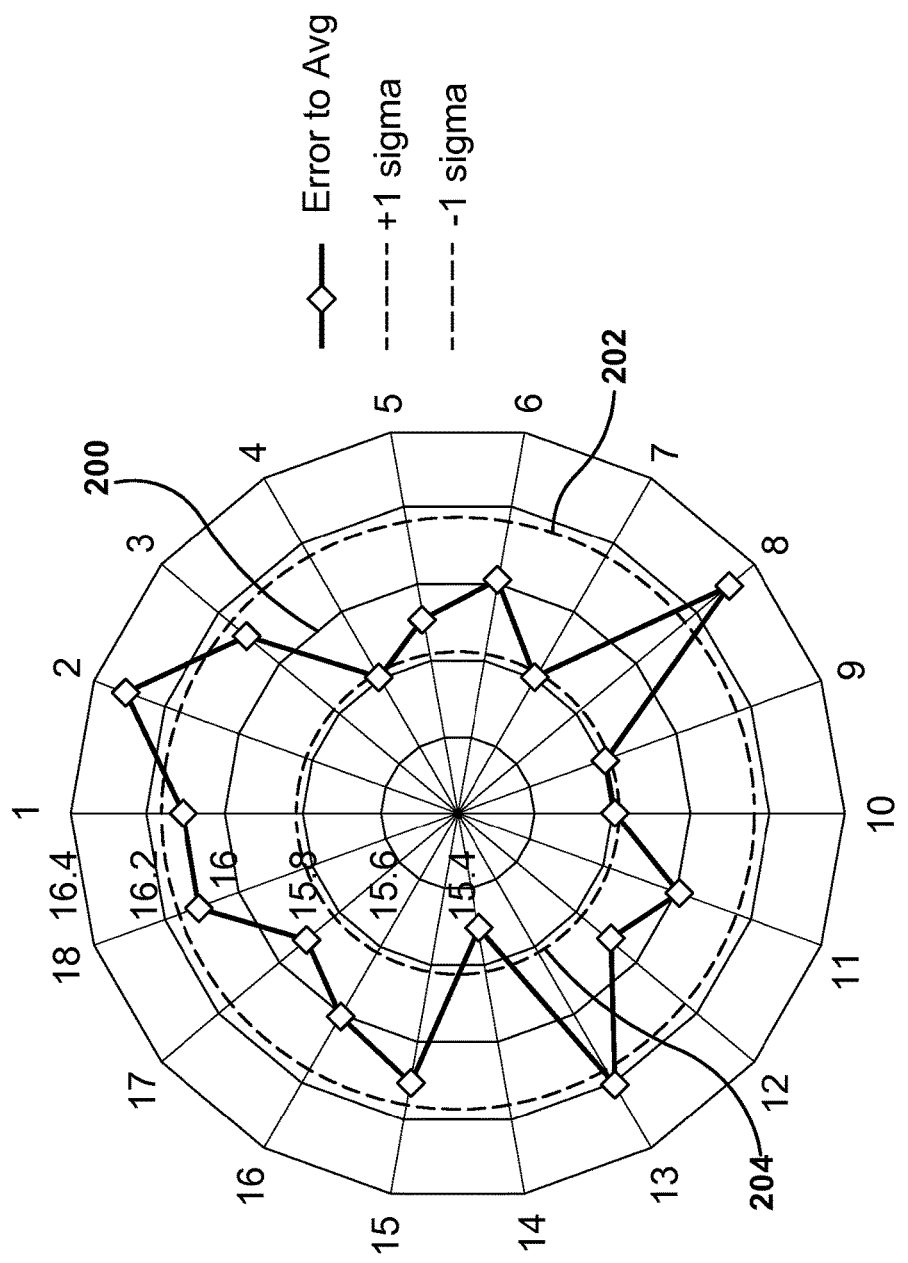
FIG. 7 shows a circle graph illustrating data from a table similar to FIGS. 4-6.

Control system 150 can work iteratively to reduce can combustor to can combustor (can-to-can) variation. In order to provide this functioning, a calculator 152 may calculate a pressure drop for each respective can combustor 102 of the plurality of can combustors between a selected combustion fluid, e.g., air, fuel or diluent, upstream of combustion chamber 104 and a combustion flow within combustion chamber 104 of the respective can combustor 102. Calculator 152 may then calculate a differential between the respective pressure drop for each of the plurality of can combustors 102 and an average pressure drop across all of the plurality of can combustors 102. That is, a differential between individual can combustor's pressure drop and an average pressure drop for all of the can combustors. Controller 154 then modifies a combustion parameter, i.e., by way of a combustion parameter instruction 156 (FIG. 2), particular to at least one can combustor 102 to reduce the error for the at least one can combustor. FIGS. 4-6 show tables of can combustor differentials during passes of operation by control system 150 according to embodiments of the invention; and FIG. 7 shows a circle graph illustrating the data from the table of FIG. 4.

As shown in FIGS. 4-6, during each iteration, calculator 152 calculates a pressure drop (dP) for each respective can combustor 102 (FIG. 1) of the plurality of can combustors between a selected combustion fluid upstream of combustion chamber 104 (FIG. 1) and a combustion flow within the combustion chamber of the respective can combustor. The pressure drops (dP) for eighteen can combustors numbered 1-18 are shown in the left columns of FIGS. 4-6. (It is understood that while FIGS. 4-7 illustrate data for a combustor system 100 including eighteen (18) can combustors 102, any number of can combustors 102 could be employed). With regard to calculation of the pressure drop by calculator 152, the pressure drop can be calculated by differencing the pressure measured by each first sensor(s) 180 of a combustion flow within combustion chamber 104 of a respective combustor can 102 and a pressure measured upstream of combustion chamber 104 by second sensor(s) 182A, F, D for the selected combustion fluid. As stated, in one example, pressure sensor 182A may be positioned in passage 120 (FIG. 1). However, since the air flow to each of the plurality of can combustors 102 is typically provided at the same pressure via a common passage 120 and/or 124 (manifold), second pressure sensor(s) 182A can be positioned anywhere from the compressor (not shown) to burner tubes 140. Typically, the air pressure is substantially the same as that from the compressor discharge ($P_{CD}$). Calculator 152 may also calculate the average pressure drop for all of the can combustors 102, e.g., a mean average pressure drop. Although not necessary or typical, the average pressure drop for each pass/iteration, shown FIGS. 4-6, is the same at −15.68.

As also shown in FIGS. 4-6, calculator 152 calculates a differential (Error to Avg.) between the respective pressure drop (dP) for each of the plurality of can combustors 102 and an average pressure drop across all of the plurality of can combustors. The values for the eighteen can combustors 1-18 are shown in the right columns in FIGS. 4-6. That is, by subtracting the pressure drop for each can combustor 102 from the average pressure drop across all of the can combustors, calculator 152 calculates the differentials. FIG. 7 shows a circle graph representation for each of the eighteen can combustors numbered 1-18. In FIG. 7, an average is shown at a circle 200 at radial value 15.68, and +/− one standard deviation (sigma) values are shown by dashed circles 202, 204, respectively. Further, the differentials for each can combustor numbers 1-18 is shown by a diamond connected by a dark line. FIG. 7 illustrates how different can combustor differentials can vary from an average and indicates both positive value outliers (e.g., numbers 2 and 8) and negative value outliers (e.g., number 14). Collectively, the pressure drop variation from the average pressure drop represents can-to-can operational variation.

As part of each iteration, controller 154 (FIG. 2) modifies a combustion parameter particular to at least one can combustor 102 to reduce the differential for the at least one can combustor, e.g., by instigating a combustion parameter instruction 156 (FIG. 2). The "combustion parameter" that is modified can take a variety of forms, and when and how it is modified can take a variety of forms. In terms of the type of combustion parameter, in one embodiment, the combustion parameter can include, for example, a flow of at least one fuel to the particular can combustor 102, e.g., flow rate, pressure, etc. Here, the modification can occur in real-time during operation by combustion parameter instruction 156 (FIG. 2) including an instruction to increase or decrease the flow of fuel, e.g., by adjusting one or more valves 132 (FIG. 1) and/or a fuel pump(s) (not shown) for the fuel(s) being delivered to the particular can combustor 102. For real time adjustment, the combustion parameter could also include, for example, a flow of diluent, e.g., by adjusting one or more valves 136 (FIG. 1) and/or a diluent supply pump(s) (not shown) for the diluent(s) being delivered to the particular can combustor 102. While a particular list of combustion parameters have been listed, it is emphasized that any other actively controllable parameter that impacts the combustion process within a particular can combustor 102 can also be modified by controller 154. In addition, while particular combustion parameters have been described as modified individually, two or more combustion parameters, e.g., two or more fuels, one fuel and one diluent, two or more diluents, etc., can be modified substantially simultaneously.

Controller 154 can select which can combustor(s) 102 to address in a number of ways. In one embodiment, controller 154 selects a particular can combustor 102 based on the differential therefor being greater than the differential of a remainder of the can combustors. Referring to FIG. 4, can combustor number 10 has the largest differential (−0.68) amongst the can combustors, and thus may be one of the can combustors having a combustion parameter modified. As shown in FIG. 5, after a first pass of operation of control system 150 (FIG. 2), can combustor number 10 has an error that is reduced to −0.27. In this manner, a single can combustor 102 can be modified in each iteration to reduce their respective errors, and thus can-to-can variation during operation.

Turning to the details of FIGS. 4-6 to describe the iterative operation of control system 150, as can be observed in each table, a number of can combustors 102 have differentials that are larger than others. In later iterations, as shown after a first pass in FIG. 5, can combustor number 1 has the overall largest differential (−0.33) and would be modified; and after a second pass, as shown in FIG. 6, can combustor number 10 has the overall largest differential (−0.27), and would be modified.

In another embodiment, controller 154 may modify the combustion parameter of a pair of the plurality of can combustors 102 to reduce the differential of each of the pair of the plurality of can combustors. Controller 154 may select the pair in a number of ways. In one example, controller 154 may select a pair of the plurality of can combustors 102 based on the differential for one being positively greater than the differential of a remainder of the plurality of can combustors, and the differential of the other being negatively greater than the differential of a remainder of the plurality of can combustors. In FIG. 4, can combustor number 10 has the positively greatest differential (i.e., 0.40) compared to a remainder of the plurality of can combustors, and can combustor number 9 has the negatively greatest error (i.e., −0.68) compared to a remainder of the can combustors. In FIG. 4, the differentials vary from −0.68 to 0.40 (1.08 points total, standard deviation 0.30) indicating a relatively large variation can-to-can. After a first pass by control system 150, however, can combustors 10 and 9 have their differentials reduced to 0 and −0.25, respectively. As shown in FIG. 5, after the first pass, can combustors numbered 8 and 1 have the largest positive differential (0.26) and the largest negative differential (−0.33) amongst all of the can combustors, respectively. The range of differentials is now reduced to 0.59 points total (−0.33 to 0.26), standard deviation 0.19, indicating reduced can-to-can variation compared to FIG. 4. After a second pass, as shown in FIG. 6, can combustors numbered 8 and 1 have their differentials reduced to 0 and −0.07, respectively. The range of differentials is now reduced to 0.43 points total (−0.27 to 0.16), standard deviation 0.15. As control system 150 continues to iterate, the can-to-can variation continues to be reduced by modifying a combustion parameter of those can combustor(s) that have a larger differential than other can combustors. While one way of selecting a pair of can combustors 102 has been described, it is emphasized that other ways may be possible to select the pair of can combustors 102, e.g., random selection, highest/lowest average over time, etc. In any event, each iterative pass by control system 150 acts to reduce the differential of one or more can combustors, and improve performance. Further, while modification of a single can combustor or a pair of can combustors have been described, control system 150 may act to modify more than two during each iteration. In this case, selection of can combustors to modify a combustion parameter of can be made in any fashion desired, e.g., largest positive value and two largest negative values.

Controller 152 may determine an extent to modify the combustion parameter for the can combustor(s) 102 in a number of ways. For example, the extent of modification can be determined by empirical data as may be implemented in a knowledge network or a fixed look up table based on differential size. In one example, for each 0.01 pressure difference, a fuel flow may be respectively increased or decreased 0.005 liters/second. Alternatively, a neural network arrangement can be employed that actively improves over time to understand the amount of combustion parameter change required. Where a pair of can combustors 102 have been selected, an extent to which the combustion parameter of the pair of the plurality of can combustors is modified by controller 154 may be based on a smallest of the differentials of the pair of the plurality of can combustors selected. That is, in regard to the illustrative FIG. 4 situation, controller 154 would adjust the combustion parameter of can combustors number 9 and 10 based on the differential of can combustor number 9 because it is the smaller differential (0.40 vs. −0.68), rather than can combustor number 10. In this manner, the amount of correction provided is in a smaller increment so as to prevent over-correction in any iteration. In an alternative embodiment, the extent each can combustor number 9 and 10's combustor parameter is modified could be particular to the can combustor.

As noted herein, control system 150 may calculate pressure drops, differentials and modify the combustion parameter for one or more can combustor(s) 102 on an iterative basis so as to continually reduce the differentials of the plurality of can combustors 102 in real-time and in an automated fashion. As described herein, the selected combustion fluid is used for each iteration. It is emphasized however that the selected combustion fluid being evaluated may not need to be the same for each iteration, e.g., it may be air for one iteration, and fuel for another. As the differential is indicative of variation between can combustors, reduction thereof over time also reduces can-to-can variation in operation. In an alternative embodiment, in addition to real-time, automated control, control system 150 may be employed to identify trends over time that may indicate required maintenance of a particular can combustor. Here, where a differential for particular can combustor 102 cannot be reduced during operation, a combustion parameter of can combustor 102 may include a physical attribute thereof that is modified during down-time of combustor system 100 (FIG. 1). Here, the modification may include a change of a structure of the can combustor 102 that impacts combustion. The physical attribute can include practically any physical feature of can combustor 102 such as but not limited to adjustment of: a nozzle throat area, orifice plate size, an end cap nozzle opening area, etc.

In another embodiment, referring to FIG. 2, control system 150 may also include a maintenance factor (MF) adjuster 157 that functions to adjust a maintenance factor (MF) for combustor 100 based on at least one differential (FIGS. 4-6). In particular, MF adjuster 157 indicates an adjustment to a maintenance factor in response to at least one differential being within a predetermined threshold. "Maintenance factors" may include any active measure of maintenance requirements that can be credited or de-credited based on various operational factors. For example, a high combustor differential may de-credit one or more maintenance factors to indicate more maintenance is required or maintenance is required earlier, while a low combustor differential may credit maintenance factors to indicate less maintenance is required. Examples of maintenance factors may include but are not limited to: a part-load maintenance factor (PLMF) that indicates part maintenance based on loading over time; or an inspection maintenance factor indicating inspection requirements based on various operational factors. As known in the art, conventional maintenance factor (MF) monitoring systems are typically part of an overall combustor (or gas turbine) control system. MF monitoring systems monitor maintenance factors, e.g., PLMF, and quantify operating mode boundaries and permissives such as but not limited to: firing temperature or proxies, combustion dynamics, etc., to determine when and what maintenance must be performed. In this regard, MF adjuster 155 may indicate a credit to a maintenance factor for a particular interval where, for example, at least one differential is maintained within a predetermined threshold. The number of differentials that must be within the predetermined threshold can be user defined, e.g., 50%, 75%, all, etc. In one example, where all differentials are maintained within a predetermined threshold, e.g., +/−0.01, for a set period of time, e.g., 1 month, MF adjuster 155 may indicate a credit of, e.g., 1 week, to a PLMF based on the lack of pressure drop variation can-to-can and its accompanying reduced loading of combustor 100. Similarly, MF adjuster 155 may indicate a de-credit where one or more differentials are not maintained within the predetermined threshold. The predetermined threshold can be user selected and may be dependent on, for example, the particular combustor size, physical attributes of can combustors 102, fuel(s) and/or diluent(s) used, etc. MF adjuster 155 may make the indication to adjust (credit/decredit) to any conventional MF monitoring system that actively calculates maintenance factors, e.g., an overall combustor control and/or maintenance monitoring system. While the above examples indicate a particular MF adjustment, MF adjuster 155 may simply indicate "adjust", "credit" or "de-credit" and the conventional MF monitoring system could determine whether to credit/decredit the particular maintenance factor(s) according to any now known or later developed formula, e.g., one that also evaluates other operational factors.

As described herein, control system 150 uses existing can combustor pressure drops as a reference to modify a combustion parameter, such as fuel and/or diluent flow, to achieve either the desired F/A ratio or to reduce the F/A ratio variation between can combustors. Since can-to-can variation in operating conditions is a large contributor to the total emissions, reduction of a differential indicative of a particular can's variation from others may reduce total emissions. In a gas turbine application, for example, this control can lead to reduced emissions of carbon monoxide during gas turbine turndown, and reduced emissions of nitrous oxide during higher firing temperatures. In addition, reduction of can-to-can variation can improve an operation space and dynamics of combustor system 100. In contrast to conventional systems, control system 150 focuses on can-to-can variation instead of absolute combustor operating conditions, which allows the use of a simple and robust measurement to provide a relative indication of how a can combustor is operating as compared to the other can combustors in the system. Control system 150 and its method of operation are less expensive than manufacturing, repair, and maintenance solutions to reduce variation, and may result in improved reliability. That is, it is typically less expensive to adjust for the actual variation in combustor operating conditions from dimensional variation in can combustors, mal-distribution from supply piping, hardware installation differences, hardware degradation differences, and other sources of variation. Control system 150 also provides a mechanism to reduce maintenance time and costs by readily identifying the can combustors that need repair. Further, control system 150 provides a mechanism to address in real-time installation and degradation variations that would previously have to wait for scheduled maintenance.

It should be noted that in some alternative implementations, the acts noted in the description and/or drawings or blocks thereof may occur out of the order noted, for example, and may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A control system for a combustor system including a plurality of can combustors, each can combustor accommodating combustion of a plurality of combustion fluids in a combustion chamber thereof, the control system comprising:
   a calculator calculating:
   a) a pressure drop for each respective can combustor of the plurality of can combustors between a selected combustion fluid upstream of the combustion chamber and a combustion flow within the combustion chamber of the respective can combustor, and
   b) a differential between the respective pressure drop for each of the plurality of can combustors and an average pressure drop across all of the plurality of can combustors; and
   a controller modifying combustion parameters of a pair of the plurality of can combustors to reduce the differential of each of the pair of the plurality of can combustors, wherein the controller selects the pair of the plurality of can combustors based on the differential for one of the pair being positively greater than the differential of a remainder of the plurality of can combustors, and the differential of the other of the pair being negatively greater than the differential of a remainder of the plurality of can combustors, and an extent to which the combustion parameters of the pair of the plurality of can combustors are modified by the controller is based on a smallest of the differentials of the pair of the plurality of can combustors.

2. The control system of claim 1, further comprising a sensor system including a first pressure sensor for measuring a combustion flow pressure within the combustion chamber of each of the plurality of can combustors.

3. The control system of claim 2, wherein the sensor system further includes: a second pressure sensor measuring a pressure of the selected combustion fluid upstream of the combustion chambers of each of the plurality of can combustors.

4. The control system of claim 1, wherein the calculator and the controller iteratively perform the pressure drop calculating, the differential calculating and the combustion parameters modifying.

5. The control system of claim 1, wherein the combustion parameters particular to at least one can combustor includes a flow rate of at least one combustion fluid.

6. The control system of claim 1, wherein the combustion parameters particular to at least one can combustor includes a physical attribute.

7. The control system of claim 1, further comprising a maintenance factor adjuster configured to indicate an adjustment to a maintenance factor in response to at least one differential being within a predetermined threshold.

8. A control system for a combustor system including a plurality of can combustors, each can combustor accommodating combustion of a plurality of combustion fluids in a combustion chamber thereof, the control system comprising:
   a sensor system including a first pressure sensor for measuring a combustion flow pressure within the combustion chamber of each of the respective plurality of can combustors;
   a calculator calculating:
   a) a pressure drop for each respective can combustor of the plurality of can combustors between a selected combustion fluid upstream of the combustion chamber and the combustion flow pressure within the combustion chamber of the respective can combustor;
   b) a differential between the respective pressure drop for each of the plurality of can combustors and an average pressure drop across all of the plurality of can combustors; and
   a controller modifying combustion parameters of a pair of the plurality of can combustors to reduce the differential of each of the pair of the plurality of can combustors, wherein the controller selects the pair of the plurality of can combustors based on the differential for one of the pair being positively greater than the differential of a remainder of the plurality of can combustors, and the differential of the other of the pair being negatively greater than the differential of a remainder of the plurality of can combustors, and an extent to which the combustion parameters of the pair of the plurality of can combustors are modified by the controller is based on a smallest of the differentials of the pair of the plurality of can combustors, wherein the control system iteratively performs the pressure sensing, the pressure drop calculating, the differential calculating and the combustion parameters modifying.

9. The control system of claim 8, wherein the sensor system further includes: a second pressure sensor measuring a pressure of the selected combustion fluid upstream of the combustion chambers of each of the plurality of can combustors.

10. The control system of claim 8, wherein the combustion parameters particular to at least one can combustor includes a flow rate of at least one combustion fluid.

11. The control system of claim 8, wherein the combustion parameters particular to at least one can combustor includes a physical attribute.

12. The control system of claim 8, further comprising a maintenance factor adjuster configured to indicate an adjustment to a maintenance factor in response to at least one differential being within a predetermined threshold.

13. A method for controlling a combustor system including a plurality of can combustors, each can combustor accommodating combustion of a plurality of combustion fluids in a combustion chamber thereof, the method comprising:

determining a pressure drop between a selected combustion fluid upstream of the combustion chamber and a combustion flow within the combustion chamber of each respective can combustor;

calculating a differential between the respective pressure drop for each of the plurality of can combustors and an average pressure drop across all of the plurality of can combustors;

selecting a pair of the plurality of can combustors based on the differential for one of the pair being positively greater than the differential of a remainder of the plurality of can combustors, and the differential of the other of the pair being negatively greater than the differential of a remainder of the plurality of can combustors; and modifying combustion parameters of the pair of the plurality of can combustors to reduce the differential of each of the pair of the plurality of can combustors wherein an extent to which the combustion parameters of the pair of the plurality of can combustors are modified is based on a smallest of the differentials of the pair of the plurality of can combustors.

* * * * *